United States Patent [19]

Izzo et al.

[11] Patent Number: 4,546,003
[45] Date of Patent: Oct. 8, 1985

[54] EDIBLE COMPOSITION COMPRISING DISCRETE FAT-BEARING PARTICLES IN A FAT-BEARING MATRIX

[75] Inventors: Henry J. Izzo, Bridgewater; John P. McNaught, Saddle River, both of N.J.

[73] Assignee: Lever Brothers Company, New York, N.Y.

[21] Appl. No.: 551,774

[22] Filed: Nov. 14, 1983

Related U.S. Application Data

[63] Continuation-in-part of Ser. No. 402,710, Jul. 28, 1982, abandoned.

[51] Int. Cl.⁴ ............... A23C 19/00; A23C 19/09; A23D 3/00
[52] U.S. Cl. ............... 426/581; 426/582; 426/583; 426/601; 426/603
[58] Field of Search .............. 426/603, 604, 607, 89, 426/581, 582, 601, 583

[56] References Cited

U.S. PATENT DOCUMENTS

| | | | |
|---|---|---|---|
| 8,048 | 1/1878 | Andrew . | |
| 2,330,986 | 10/1943 | Miller et al. . | |
| 2,526,302 | 10/1950 | Turgasen . | |
| 2,575,874 | 11/1951 | Herlow | 426/603 X |
| 2,605,185 | 7/1952 | Zachariassen et al. . | |
| 2,787,550 | 4/1957 | Struble et al. | 426/603 X |
| 2,913,342 | 11/1959 | Cameron et al. . | |
| 2,997,396 | 8/1961 | North et al. . | |
| 3,366,492 | 1/1968 | Voss et al. . | |
| 3,488,199 | 1/1970 | Gander et al. | 426/603 |
| 3,647,480 | 3/1972 | Cermak . | |
| 3,682,656 | 9/1972 | Wilton et al. . | |
| 4,305,970 | 12/1981 | Moran et al. | 426/603 |
| 4,366,180 | 12/1982 | Altrock et al. | 426/603 X |
| 4,414,236 | 11/1983 | Moran et al. | 426/603 X |

FOREIGN PATENT DOCUMENTS

| | | |
|---|---|---|
| 56682 | 7/1982 | European Pat. Off. . |
| 650481 | 2/1951 | United Kingdom . |

OTHER PUBLICATIONS

Webb, B. H., et al., "Fundamentals of Dairy Chemistry", The AVI Publ. Co. Inc., Westport, Conn., 1965, pp. 492–495.

Primary Examiner—Robert Yoncoskie
Attorney, Agent, or Firm—Milton L. Honig; James J. Farrell

[57] ABSTRACT

The present invention provides an edible, non-pourable plastic or semi-plastic composition comprising 0.1 to 80% by weight of discrete, fat-bearing, plastic, semi-plastic, or liquid particles dispersed in a fat-bearing plastic or semi-plastic matrix, said matrix and said particles each comprising 10 to 100% by weight of fat, said particles having a size of about 0.04 mm to 10.0 mm and a Wiley mp less than 100° F. Alternatively, either the matrix, or the particles or both the matrix and the particles may comprise sucrose polyesters.

The present invention also relates to a method for preparing a composition comprising discrete particles containing 10 to 100% by weight of fat and having a particle size of 0.04 to 10.0 mm in a margarine matrix comprising the steps of introducing 0.1 to 80% by weight of said particles into said matrix at a temperature below the melting point of the particles while the matrix is in a liquid supercooled state; and cooling the composition. In an advantageous alternative embodiment said particles are sprinkled onto said matrix while it is still in solid, extruded, strand form. The sprinkled strands are thereafter combined and extruded in the form of prints, sticks or bars. If the particles as they are sprinkled onto the extruded matrix are larger than 10.0 mm, they are comminuted to the size range of 0.04 to 10.0 mm by passage of the particle and matrix mixture through a suitable perforated plate.

24 Claims, 1 Drawing Figure

U.S. Patent
Oct. 8, 1985
4,546,003
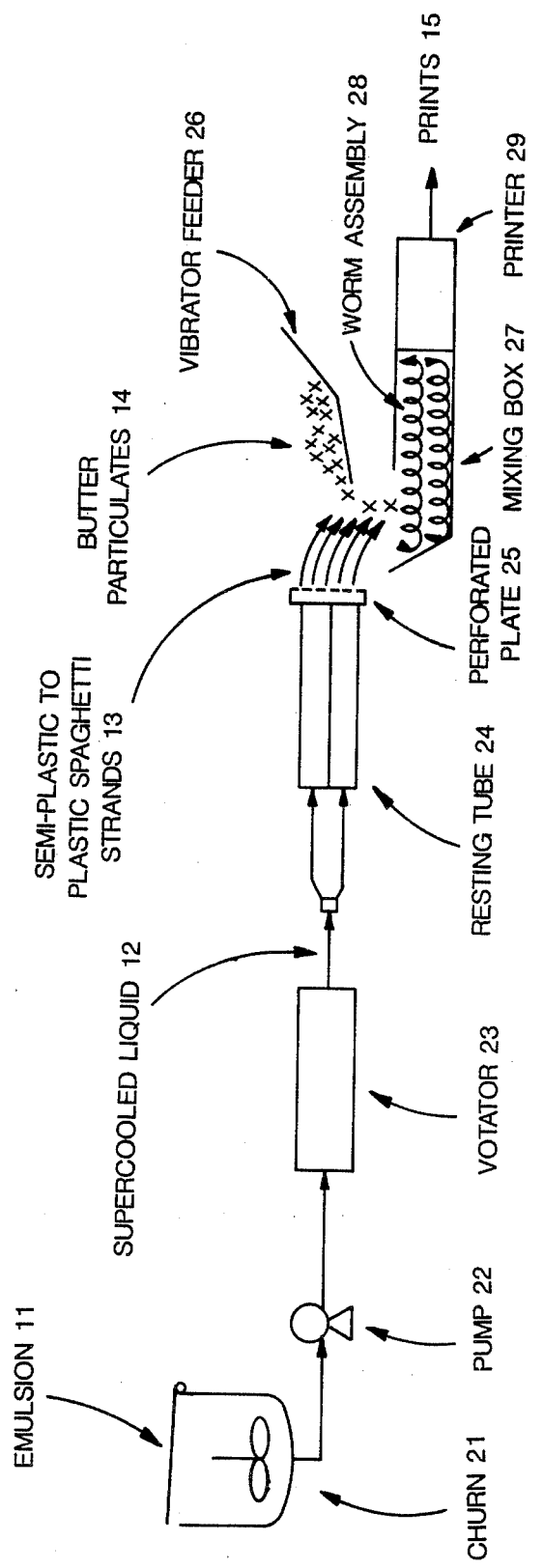
FLOW DIAGRAM FOR PRODUCTION OF MARGARINE WITH PARTICULATE BUTTER WHILE THE MARGARINE IS IN SEMI-PLASTIC TO PLASTIC FORM

EDIBLE COMPOSITION COMPRISING DISCRETE FAT-BEARING PARTICLES IN A FAT-BEARING MATRIX

This application is a continuation-in-part of copending application Ser. No. 402,710, filed on July 28, 1982 now abandoned.

The present invention is directed to edible fatty compositions and more specifically to compositions comprising discrete fat-bearing particles in a fat-bearing matrix.

Many fatty food products which are considered to be especially tasty and, therefore, desirable by consumers are made of expensive and mostly natural materials. Such premium materials include butter, cheese, cream cheese and sour cream.

In addition to taste, many premium ingredients have a characteristic feel in the mouth which is recognized and desired by consumers. For example, the melting of real butter in the mouth creates a characteristic cooling effect which is highly desired by consumers.

In order to reduce costs, manufacturers have provided substitute, and often synthetic, materials which are less expensive to manufacture. Such substitutes include margarine, synthetic sour cream, synthetic cream cheese and various cheese spreads. Although these substitute materials are less expensive, they do not have the desired taste or mouth feel of the premium materials.

In an attempt to combine taste and low cost, mixtures of premium ingredients and less costly ingredients have been provided. These prior art mixtures are, for the most part, homogeneous. A common example is a mixture of butter homogeneously dispersed in margarine. Such compositions do not, however, have the characteristic taste or cool melting feel of butter. Even the presence of up to 40% butter in margarine does not impart the genuine taste and mouth feel characteristics of butter to such homogeneous compositions.

Compositions containing discrete particles of fat in a fat base are also known. For example, North et al, U.S. Pat. No. 2,997,396 to the Beatrice Food Company disclose "a body of plastic margarine fat having uniformly dispersed therethrough discrete particles of fat encased in non-fat milk solids". This composition, however, is disadvantageous for the purposes of the present invention in that the fat particles have sizes between about 0.5 and 2.5 microns. Such particles would not be readily discernible to consumers.

Similarly, Cermak, U.S. Pat. No. 3,647,480 to the S.C.M. Corporation, discloses discrete particles of a condiment attached to a fatty matrix particle for use in foodstuffs such as cakes, donuts, bread and the like. Such compositions would be disadvantageous for present purposes in that the fatty matrix particle has a Wiley melting point of at least 100° F. Such particles would be very hard and would impart to compositions containing them an undesirable gritty feel.

Zachariassen et al, U.S. Pat. No. 2,605,185, also disclose compositions containing two fatty components. The compositions are prepared by heating one fat component at a temperature somewhat above its solidification point or at a temperature below the solidification point while still maintaining a liquid state. The second component is added in a liquid state to the molten or supercooled first component. The second component may be, for example, an emulsion of a fat. So produced, the Zachariassen et al compositions should contain globules of no more than 15 microns and probably much less. Such globules are considerably smaller than those contemplated by the invention described and claimed below.

Commercial products containing discrete fat bearing particles are also known. Examples include chunky peanut butter, which contain pieces of peanuts in a peanut butter base, and salad dressings containing pieces of blue cheese in a liquid oil-containing base. These compositions are disadvantageous in that the particles have a substantially different feel than the matrix. Therefore, it would be readily discernible to the consumer that a two phase system was involved.

OBJECTS OF THE INVENTION

It is an object of the present invention to provide food compositions comprising a premium ingredient and a substitute ingredient having the taste and mouth-feel characteristics of the premium ingredient.

It is another object of the present invention to provide compositions comprising fat-bearing discrete particles in a fat-bearing matrix which substantially avoid the disadvantages of prior art compositions.

It is a further object of the present invention to provide compositions comprising fat-bearing discrete particles in a fat-bearing matrix wherein consumers perceive the composition as having at least some taste, feel, and sight characteristics of the particles.

It is an additional object of the present invention to provide a method for producing compositions comprising discrete fat-bearing particles in a fat-bearing matrix.

SUMMARY OF THE INVENTION

These and other objects of the present invention as will become apparent to one of ordinary skill in the art have been achieved by providing an edible, non-pourable plastic or semi-plastic composition comprising 0.1 to 80% by weight of discrete, fat-bearing, plastic, semi-plastic, or liquid particles dispersed in a fat-bearing plastic or semi-plastic matrix, said matrix and said particles each comprising 10 to 100% by weight of fat, said particles having a size of about 0.04 mm to 10.0 mm and a Wiley mp less than 100° F.

The present invention also relates to methods for preparing a composition comprising discrete particles containing 10 to 100% by weight of fat and having a particle size of about 0.04 to about 10.0 mm in a margarine or other fat bearing matrix. Particles larger than 10 mm are equally usable in the practice of the method if they are introduced at an initial stage. A comminution device which is capable of effecting size reduction of such particles to fall within the aforesaid range of about 0.04 to about 10.0 mm may then be used to prepare the final product. Preferably, a particle size range of about 0.04 mm to about 4.8 mm is employed. A method of general applicability comprises the steps of introducing 0.1 to 80% by weight of said discrete particles into said margarine or other fat bearing matrix at a temperature below the melting point of the particles while the matrix is in a liquid supercooled state; and cooling the composition. An advantageous method of particular applicability in the making of margarine prints or sticks comprises the steps of processing a print margarine emulsion through a Votator unit and thereafter through a resting tube system; delivering the resulting partially crystallized stock through a perforated plate at the end of said resting tube system to cause said stock to assume the form of spaghetti strands; sprinkling said spaghetti strands with discrete particles containing 10 to 100% by weight of fat in a particle size range of about 0.04 mm to about 10.0 mm or larger if a comminution device is to be employed, preferably in the approximate size range of 0.04 mm to 4.8 mm in such an amount as to cause the incorporation of 0.1 to 80% by weight of said particles in the resulting processed print margarine emulsion; intimately mixing said particles with said spaghetti strands in a mixing box comprising a worm to form an intimate mixture; optionally passing the intimate mixture through a comminuting device so as to break down any optionally present particles larger than 10.0 mm to a size therebelow and extruding said intimate mixture from a printer to form product margarine prints or sticks.

BRIEF DESCRIPTION OF THE DRAWING

For a better understanding of the invention as it relates to the advantageous method of making margarine prints or sticks immediately set out above, reference is now made to the accompanying drawing which is submitted for illustrative purposes only and which shows diagrammatically in a simplified manner how one embodiment of this particular aspect of the invention may be practiced.

DETAILED DESCRIPTION OF THE INVENTION

It has now been discovered that compositions comprising a premium food ingredient and a substitute food ingredient can be made to assume the characteristics of the premium ingredient to an unexpected extent. This is achieved when the premium ingredient is present as discrete particles in a matrix of the substitute ingredient. This is especially true when the discrete particles are discernible.

It is not entirely certain why this is the case, and the present claims are not limited in any way to a particular theory. It is believed, however, that the taste buds on the tongue sense whatever flavor elements they come in contact with at the concentration of those flavor elements in the specific contact area. When the taste buds sense the particles of the premium ingredient, there appears to be a perception that the premium ingredient is present in a concentration higher than it really is.

The effective perception is that the premium ingredient is relatively pure. This perception would be lost where the particles have a significantly different feel from that of the matrix. For example, the feel of peanuts in a peanut butter matrix or of blue cheese particles in a liquid oil matrix does not give the sensation of eating peanuts or blue cheese.

In the present invention, the particles and the matrix have substantially the same feel since the particles are liquid, plastic or semi-plastic and the matrix is plastic or semi-plastic. It is especially preferred that the particles be plastic or semi-plastic.

The taste perception described above would also not occur when the premium ingredient and the substitute ingredient are present in a homogeneous composition. In such compositions, the predominant perception appears to be that the sensed composition contains a premium ingredient diluted in a substitute ingredient.

The role that psychology plays in this effect is not certain but should not be underestimated. It is believed that the perception of the premium ingredient is enhanced when the consumer is able to sense that the composition contains the premium ingredient. In this way, the consumer is alerted to, and expects, the taste and feel of the premium ingredient.

The present compositions are edible ones which may be used alone or in combination with any food product where fat is desirable. Such foods include, for example, pastries, crackers, rolls, breads, muffins, cookies and the like. In fact, any food which advantageously contains unmelted fat may benefit from the invention claimed herein.

THE PARTICLES

As the fat-bearing particles of the claimed compositions are usually more costly than the matrix into which they are placed, it is advantageous for economic reasons to use as little of the fat-bearing particles as possible. The lower limit is set by that amount which is organoleptically and/or otherwise perceptible to the consumer. The compositions of this invention at the minimum contain 0.1% by weight, preferably 2% by weight, and most preferably 5% by weight of the fat-bearing particles in a matrix. (All percentages in the specification and claims are by weight unless otherwise indicated.)

Alternatively, either the matrix or the particles or both comprise synthetic materials. Examples of such synthetic materials include, without limitation those materials known as sucrose polyesters, which are described, e.g., in U.S. Pat. Nos. 3,093,481; 3,600,186; 3,963,699 and 3,521,827. See also "Preparation of Sucrose Esters by Interesterification", Journal of the American Oil Chemical Society, 47 [s], 56–60 (1970).

The maximum amount of particles in the matrix is determined by economic factors and the ability conveniently to disperse the particles in the matrix. Generally, larger amounts of the fat-bearing particles lead to a greater perception of the particles by the consumer. The maximum amount of the fat-bearing particles in the claimed compositions is 80% by weight, preferably 60% by weight, and most preferably 20% by weight.

Particles suitable for use in the claimed compositions contain 10 to 100% by weight, preferably 30 to 97.5% by weight, and most preferably 65 to 85% by weight of fat. The fat may suitably comprise any edible fatty acid triglyceride. The fatty acids which are present in the triglyceride may be unsaturated or saturated and will generally be a mixture of unsaturated and saturated fatty acids. Some suitable unsaturated fatty acids include oleic acid, palmitoleic acid, linoleic acid, and linolenic acid. Some suitable saturated fatty acids include butyric acid, capric acid, caprylic acid, lauric acid, myristic acid, palmitic acid, and stearic acid.

In addition to the fat, the particles of the claimed compositions generally also include 0 to 90% by weight, preferably 2.5 to 70% by weight and most preferably 15 to 35% by weight of water. Optional ingredients such as coloring agents, preservatives, antioxidants, vitamins and flavors may also be present. Some suitable coloring agents include beta carotene, annato, carrot oil, and turmeric. Some suitable preservatives and antioxidants include BHA, propyl gallate, TBHQ, EDTA, citric acid, sodium benzoate, potassium sorbate and mixtures thereof. Some suitable vitamins include vitamin D and vitamin A. These optional ingredients generally do not affect the essential character of the particle.

The particles may be of natural or synthetic materials. Since natural materials enhance consumer acceptance of food products, the particles of the present invention preferably consist essentially of natural materials. Some sources of natural materials suitable for use in the particles include butter, sour cream, cream cheese and the like. Cheeses such as cheddar cheese, blue cheese, Camembert, brie, muenster, gouda and the like also provide suitable sources of natural materials for use in the particles.

The preferred natural materials are butter and butter oil. Butter, which is especially preferred, is a milk fat product which contains not less than 80% milk fat, 17.5 to 19.5% water, and 0.4 to 1.0% non-fat milk solids. It is important to distinguish butter from butter oil, which is obtained by melting butter and removing the separated water and non-fat milk solids.

Other natural products suitable for use in the present compositions are cream cheese, other cheeses, cheese products, cheese spreads and sour cream. According to U.S. Food and Drug Administration (FDA) standards, cream cheese contains not less than 33% milk fat, not less than 22% non-fat milk solids, and not more than 55% water. Under the same FDA standards, sour cream contains not less than 14.4% milk fat. Similarly, a composition must contain at least 23% fat, 33% non-fat milk solids, and no more than 44% water to qualify as a cheese product and at least 20% fat and more than 44% but no more than 60% water to qualify as a processed cheese spread according to the FDA. These FDA standards do not apply to synthetic (i.e. artificial) cream cheese, cheese, sour cream, cheese products and cheese spreads.

The size of the particles used in the claimed compositions is critical to the present invention. For example, in compositions comprising butter particles in margarine, the margarine generally melts sooner, and is, therefore, perceived earlier than the butter. The timing of the melting of the butter is affected by the particle size since smaller particles melt more rapidly than larger particles. Thus, the smaller the particle size of the butter, the earlier the taste sensation of butter is received by the brain of the consumer. With larger particles, the taste sensation occurs somewhat later, but lasts for a longer duration of time. The advantages of both the small and large particle sizes may be obtained by using particles with a fairly large range of sizes.

The minimum particle size is that which can be produced by available equipment and is perceptible to consumers. Some minimum sizes suitable for use in the particles of the invention include 0.04 mm, preferably 0.07 mm, and most preferably 0.18 mm.

The maximum size of the particles suitable for use in the claimed compositions is that which can conveniently be placed into the matrix and which imparts to the matrix the characteristics of the ingredients of the particles. Some suitable maximum sizes include 10.0 mm, preferably 4.8 mm, more preferably 2.4 mm, and most preferably 1.0 mm. Particles much larger than 10.0 mm may also be utilized in the process of preparing the final product so long as comminution equipment or a shear device effective in breaking down the particles as contained in a mixture of the particles and the matrix is utilized before packaging of the particle containing matrix end product for consumer use.

It may be desirable or undesirable for the particles to be visible in the matrix. Visibility depends to some extent on the particle size and on the contrast in color between the particles and the matrix.

The particles are limited to those physical states which are not perceptibly different from the plastic or semi-plastic matrix. Accordingly, the particles can be, for example, plastic, semi-plastic or liquid and are preferably plastic or semi-plastic. The particles may also be a mixture of two or more physical states.

In order to impart a desirable feel to the composition, the particles should have melting points sufficiently low so that the portion of the particles not already melted at room temperature melts in the consumer's mouth. Thus, the particles of the invention should have Wiley melting points of not much more than body temperature, e.g. 100° F., preferably 89° F. and most preferably 86° F. It is preferable that the melting point of the particles be lower than that of the matrix in order that the taste of the particle last longer than that of the matrix.

The particles described above are dispersed in a matrix as described below. Preferably, the particles are dispersed substantially homogeneously in the matrix.

THE MATRIX

The claimed compositions generally comprise 20 to 99.9% by weight, preferably 40 to 90% by weight and most preferably 60 to 80% by weight of a fat-bearing matrix. The matrix generally comprises 10 to 100% by weight, preferably 40 to 85% by weight and most preferably 60 to 80% by weight of fat.

Fats suitable for use in the matrix may be any fatty acid triglyceride. The matrix will generally contain a mixture of triglycerides. The triglycerides may comprise unsaturated or saturated fatty acids. Some suitable unsaturated fatty acids include oleic acid, linoleic acid, linolenic acid and palmitoleic acid. Some suitable saturated fatty acids include capric acid, caprylic acid, lauric acid, myristic acid, palmitic acid and stearic acid.

In addition to fat, the matrix may contain one or more optional ingredients. Such optional ingredients include, for example, water and dairy solids. Dairy solids include, for example, whey, non-fat dry milk, casein, and mixtures thereof. Coloring agents, flavoring agents, preservatives, antioxidants, salt and the like may also be present. The same coloring agents, flavoring agents, preservatives and antioxidants suitable for use in the particles are also suitable for use in the matrix of the claimed compositions.

The matrix may comprise natural or synthetic (i.e. artificial) fatty materials. Some suitable matrices include margarine, fatty spreads, butter, synthetic or natural cream cheese, synthetic or natural sour cream, and synthetic or natural cheese spreads.

Alternatively, either the matrix or the particles or both comprise synthetic materials. Examples of such synthetic materials include, without limitation those materials known as sucrose polyesters, which are described, e.g., in U.S. Pat. Nos. 3,093,481; 3,600,186; 3,963,699 and 3,521,827. See also "Preparation of Sucrose Esters by Interesterification", *Journal of the American Oil Chemical Society,* 47 [s], 56–60 (1970).

In order to constitute a margarine, a fatty composition must have at least 80% fat although it may have as much as 100% fat. Fatty spreads may contain as little as 20% fat.

The margarines or fatty spreads suitable for use as the matrix in the presently claimed compositions may comprise any one or more of the well known edible oils commonly used for this purpose. Some suitable oils include fish oil, beef tallow, rapeseed oil, cottonseed oil, soybean oil, lard, coconut oil, palm kernel oil, sunflower oil, palm oil, safflower oil, corn oil and the like. The oils, some or all of which may be hydrogenated, are present in amounts of 20 to 100% by weight, preferably 20 to 80% by weight and most preferably 40 to 80% by weight of the margarine or fatty spread.

The margarines or fatty spreads may also include 0 to 58% by weight, preferably 22 to 38% by weight and most preferably 15 to 20% by weight of water. The margarines or fatty spreads may also contain 0.1 to 3% by weight, preferably 0.5 to 3% by weight and most preferably 0.75 to 2% by weight of dairy solids. Dairy solids include, for example, whey, non-fat dry milk, casein and mixtures thereof.

Synthetic sour creams suitable for use in the present invention suitably comprise 10 to 28% by weight, preferably 14 to 25% by weight and most preferably 15 to 20% by weight of fat. In order to thicken sour creams so that they constitute plastic or semi-plastic materials, gums such as carragheenan, alginates, xanthan gum, guar gum, locust bean gum, carboxymethylcellulose and the like may also be added. A suitable amount of gums includes 0.05 to 1.0% by weight, preferably 0.1 to 0.75% by weight and most preferably 0.30 to 0.5% by weight.

Synthetic cream cheese suitable for use as the matrix in the present invention will generally comprise 20 to 40% by weight, preferably 25 to 35% by weight and most preferably 33 to 35% by weight of fat. Some optional ingredients suitable for use in synthetic cream cheeses include guar gum and an emulsifier such as mono-diglyceride.

Synthetic cheese spread matrices will generally comprise 10 to 40% by weight, preferably 15 to 30% by weight and most preferably 18 to 20% by weight of fat. Some optional ingredients suitable for use in synthetic cheese spreads include cheese whey solids, disodium phosphate, xanthan gum and sorbic acid.

THE COMPOSITION

The presently disclosed compositions are plastic or semi-plastic and comprise discrete particles in a matrix. For the purposes of this specification, plastic and semi-plastic compositions are those solid compositions which under the action of external forces undergo permanent deformation without rupture.

The plastic or semi-plastic compositions contemplated are those which are normally spread on foods with a knife or are added to foods with a spoon. Some suitable examples include bar and tub margarines, butter, cream cheese, sour cream, cheese spreads, spoonable salad dressings, mayonnaise, and the like.

Generally, the components used in the particles will be related in some way to the components used in the matrix. Thus, some preferred compositions include butter in margarine, sour cream in synthetic sour cream, cream cheese in synthetic cream cheese and various other cheeses in cheese spreads. Each composition will have characteristic proportions of components and particle sizes.

The preferred compositions comprise particles of butter in margarine. Suitable amounts of butter particles in margarine include 0.1 to 80% by weight, preferably 2 to 60% by weight and most preferably 5 to 40% by weight. Some suitable particle sizes of the butter include about 0.04 to about 10.0 mm, preferably 0.04 to 4.8 mm, more preferably 0.07 to 2.4 mm and most preferably 0.18 to 1.0 mm.

Sour cream in synthetic sour cream compositions will generally contain 0.1 to 80% by weight, preferably 2 to 60% by weight and most preferably 5 to 40% by weight of sour cream particles. Some suitable sour cream particle sizes include about 0.04 to about 10.0 mm, preferably 0.04 to 4.8 mm, more preferably 0.07 to 2.4 mm and most preferably 0.18 to 1.0 mm. The sour cream particles will generally contain 10 to 28% by weight, preferably 14 to 25% by weight and most preferably 15 to 20% by weight of fat.

Cream cheese in synthetic cream cheese compositions will generally contain 0.1 to 80% by weight, preferably 2 to 60% by weight and most preferably 5 to 40% by weight of cream cheese particles. Some suitable cream cheese particle sizes include about 0.04 to about 10.0 mm, preferably 0.04 to 4.8 mm, more preferably 0.07 to 2.4 mm and most preferably 0.18 to 1.0 mm. The cream cheese particles will generally contain 20 to 40% by weight, preferably 25 to 35% by weight and most preferably 33 to 35% by weight of fat.

Cheese in cheese spread compositions will generally contain 0.1 to 80% by weight, preferably 2 to 60% by weight and most preferably 5 to 40% by weight of cheese particles. Some suitable cheese particle sizes include about 0.04 to about 10.0 mm, preferably 0.04 to 4.8 mm, more preferably 0.07 to 2.4 mm and most preferably 0.18 to 1.0 mm. The cheese particles will generally contain 10 to 40% by weight, preferably 15 to 30% by weight and most preferably 18 to 22% by weight of fat.

The present invention is also directed to liquid margarine compositions which contain discrete particles of butter. In such liquid margarines, the particles comprise 0.1 to 80% by weight, preferably 2 to 60% by weight and most preferably 5 to 40% by weight of the composition. Some suitable butter particle sizes include about 0.04 to about 10.0 mm, preferably 0.04 to 4.8 mm, more preferably 0.07 to 2.4 mm and most preferably 0.18 to 1.0 mm.

THE METHOD OF PREPARING COMPOSITIONS COMPRISING MARGARINE MATRICES

In order to prepare the margarine compositions of the present invention, the size of the fat-bearing material which is to be used in the particles of the compositions must be reduced to the size desired. The size may be reduced using any of the known comminution methods and devices. When particles slightly or much larger than 10.0 mm are used they may be reduced in size after addition to the matrix by passage of the particle and matrix mixture through a shear device.

Suitable devices for reducing the particle size include the hammermill, Hobart silent cutter, Fitzpatrick comminution mill, Stephan vertical cutter, Waring blender and Littleford mill. The preferred device is the Fitzpatrick comminution mill. When in situ particle size reduction is effected after addition of particles larger than 10.0 mm to the matrix, a suitable shear device may, e.g., merely be a perforated extrusion plate.

The particles are preferably reduced in particle size under cryogenic conditions, generally by utilizing direct or indirect thermal contact of the particles with cold carbon dioxide or nitrogen. When size reduction of particles larger than about 10.0 mm is effected after addition to the matrix, the particles are placed in direct or indirect thermal contact with one of the foregoing refrigerants prior to their addition to the matrix. Thereby, the necessary brittleness of the particles to bring about effective size reduction when the particles and matrix mixture is extruded past, e.g., a perforated plate is ensured. When the particles contain 20 to 45% by weight of fat, it is preferable to reduce the size of the particles when the particles are at temperatures below about 35° F., preferably below about 0° F. and most preferably below about −20° F.

When the particles contain about 40 to 85% by weight of fat, it is preferable to reduce the size of the particles when the particles are at temperatures below about 0° F., preferably less than about −10° F. and most preferably less than about −40° F.

The particles may be screened by permitting the particles to pass through a standard U.S. sieve having a low mesh and collecting the particles on a sieve having a high mesh. Some suitable mesh sizes include 8 to 80 mesh, preferably 6 to 70 mesh, and most preferably 4 to 60 mesh. It will be understood that when particles larger than about 10.0 mm are employed with size reduction being accomplished by extrusion of the particles and matrix mixture past, e.g., a perforated plate, screening of the particles prior to addition to the matrix is not necessary.

The particles are added to the margarine matrix while the margarine is in a liquid state in the preparation of margarine in tub-like containers. In an advantageous embodiment of the invention as it relates to the making of a margarine product in the form of sticks or prints the particles are sprinkled onto the margarine matrix while it is in the form of spaghetti strands as a result of extrusion past a perforated plate following which the particles and the strands are intimately mixed in a worm assembly and finally extruded through a printer in the form of prints or sticks. The particles must be incorporated in the margarine in such a manner so as not to interfere with the normal crystallization of the margarine as it solidifies during cooling.

If, on the other hand, the particles are added to the liquid margarine before it has been reduced sufficiently in temperature, the particles may melt. The melting of the particles is disadvantageous for at least two reasons. The melted particles may diffuse into the molten matrix so that the cooled composition would not contain discrete particles as desired. Moreover, the melting of particles appears to cause modifications in the crystalline structure of the particles. Thus, the properties of particles which have been altered through melting and re-cooling may be different from particles which have never been melted and are, therefore, in their natural crystalline state. One of the advantages of the present process is that the particles are added to the matrix in a cooled rather than in a heated state. Compositions which are prepared in this way benefit in having the properties and flavor of the ingredients not altered.

In the making of a product wherein the resulting matrix is extruded into the form of prints or sticks it has now been discovered that the particles are preferably sprinkled onto the matrix while it is in the form of spaghetti like extruded strands. Thereafter, the sprinkled strands are intimately mixed together and finally extruded in the form of prints or sticks.

In order to prepare the claimed compositions in tub form, it has now been also discovered that in that case, the particles are preferably added to the matrix during cooling when the matrix is in a liquid, supercooled state. The matrix is considered to be supercooled when it is at a temperature at which it normally crystallizes but, because of the rapidity with which the temperature is dropped, is still liquid. Most materials have some capacity to be supercooled. Oleaginous materials such as those used in the present compositions have a relatively large tendency to supercool. For example, butter is added to super-cooled margarine when the margarine is at a temperature below about 80° F., preferably below about 65° F. and most preferably below about 50° F.

In that aspect of the invention which relates to the addition of the particles to the matrix while said matrix is in liquid, supercooled form, the particles may be added to the supercooled liquid matrix by any well known method. Such methods include, for example, the use of a Fruit feeder, ribbon blender, Hobart mixer, and Margarine B unit. The preferred method is the use of a Fruit feeder. A Fruit feeder is a machine developed by the Cherry-Burrell Company for injecting particulate matter into flowing plastic or semi-plastic compositions and especially into ice cream. Injection is accomplished by means of the action of four cam-operated pistons which slide back and forth in four grooves of a revolving rotor inside a close-fitting housing. This assembly is called the fruit pump. Materials to be fed fall into the grooves of the rotor from a cylindrical hopper directly above the fruit pump. An agitator and revolving pin wheel in the hopper keep materials loose and free so that they are able to fall into the exposed rotor grooves as they come under the hopper throat. The plastic or semi-plastic matrix and charges of particulate matter flow from the fruit pump to the vertical mixing chamber where a multi blade agitator stirs the combination in order to distribute the particulate matter uniformly through the matrix. The uniform mixture discharges from the top of the mixing chamber into suitable packaging stock such as tubs, bottles, wrapping material, jars, cans and the like or to conventional print-forming machines.

After adding the particles to the matrix, the composition is further processed for use. The compositions may be packaged as is, or may be blended with other food ingredients before packaging. For example, if the composition comprises butter in margarine, the composition may be packaged in tubs or fashioned into bars.

Advantageously, in the production of particles in margarine or spread bars, sticks or prints the butter particles are not added to the margarine matrix while such matrix is in liquid form. Instead, the particles are sprinkled onto the margarine matrix while it is in the form of extruded, spaghetti like strands. The sprinkled strands are intimately mixed together in the worm assembly and thereafter extruded into the form of bars, sticks or prints.

DESCRIPTION OF THE DRAWING

A more complete understanding of that aspect of the invention which relates to the sprinkling of fat bearing particles onto strands of a fat bearing matrix following which said strands are mixed together and extruded into the form of bars, prints or sticks may be had by reference to the accompanying schematic drawing which shows an embodiment of the previously described process in detail.

Referring to the figure in the drawing, a print margarine emulsion 11 is contained in a churn 21 and fed through a pump 22 to a Votator 23. The emulsion 11 is converted in the Votator 23 to a supercooled liquid 12 by the application of a process or processes which are known in the art. The supercooled liquid 12 is fed to a resting tube 24 where it partially crystallizes. The resulting solid stock is extruded past perforated plate 25 in the form of semi-plastic to plastic spaghetti strands 13. The spaghetti strands 13 are fed through a hopper into a mixing box 27 which comprises a worm assembly 28. A measured quantity of butter particulates 14 is sprinkled onto the spaghetti strands 13 at the feed inlet hopper of mixing box 27 from a vibrator feeder 26. The resulting sprinkled strands are picked up by a worm assembly 28 contained within the mixing box 27, intimately mixed together and extruded through the printer 29 to form product prints 15 as contemplated by the invention.

Having generally described the invention, a more complete understanding can be obtained by reference to certain specific examples, which are provided herein for purposes of illustration only. It is not intended that the examples limit the claims in any way unless otherwise specified.

EXAMPLE 1

Preparation of Particles of Butter

The butter used in this example was Armour Flavor-up Color 9 butter, which is described by the following data:

| | |
|---|---|
| Wiley Melting Point | 30.8–31.8° C. (87.4 to 89.2° F.) |
| Slip Point (Mettler) | 32.2–32.3° C. (89.9 to 90.1° F.) |
| SFI | 50° F.–30 |
| | 70° F.–12 |
| | 92° F.–3.2 |
| | 100° F.— — |
| Iodine number | 37.5–42.9 |
| Saponification equiv. | 247.7–251.8 |
| Reichert-Meissl Value | 26.1–27.4 |
| Polenske Value | 1.78–1.85 |
| Kirschner Value | 21.8 |

The butter was cut in a Hobart (Model No. 84181-D) Food cutter. A convenient amount of dry ice chunks are placed in the revolving bowl of the Hobart cutter and allowed to be chopped by the rotating blades until the dry ice becomes a fine powder (approx. 2–3 min.) Large pieces of butter at 4° to 6° C. are then added on the bed of powdered dry ice in a ratio of 1:2–3. The butter is chopped by the rotating blades of the machine until the desired particle sizes are achieved.

In Table 1, the fraction of the butter having various standard U.S. sieve numbers from 8 to 60 are reported. Separate experiments were conducted for operating the food cutter for one minute, two minutes, three minutes, four minutes, and five minutes.

TABLE 1

| Time of Chopping (min) | % Butter on Sieve — Sieve # | | | | | |
|---|---|---|---|---|---|---|
| | 8 | 14 | 20 | 40 | 60 | Thru 60 |
| 1 | 67.9 | 15.2 | 7.5 | 6.1 | 1.9 | 0.4 |
| 2 | 43.3 | 25.2 | 14.2 | 10.0 | 5.0 | 1.4 |
| 3 | 22.4 | 30.0 | 20.0 | 17.6 | 7.0 | 2.9 |
| 4 | 16.2 | 31.8 | 23.2 | 18.6 | 7.2 | 2.9 |
| 5 | 8.5 | 29.9 | 27.6 | 25.1 | 5.8 | 3.1 |

It does not appear that rigid classification of the butter is necessary if the larger particles are desired. A quick one minute chopping of the material yields 90.6% retained on screens 8, 14 and 20. Medium size particles are easily obtained by increasing the chopping time.

EXAMPLE 2

Preparation of Butter Particles

Ten lbs. of coarse chunks of dry ice (solid $CO_2$) were placed in the bowl of a Hobart Silent Cutter and chopped until the dry ice particles were reduced to the size of snow (chopping time—approx. 2–3 minutes). Four lbs. of butter (in chunks at 4°–6° C.) were then added and chopped until their particle size was reduced to the range of 0.04 to 4.8 mm (chopping time—approx. 2–3 minutes).

The chopped dry ice/butter combination was then sieved through a Ro-Tap Sieving machine for two minutes using sieve size ranges from #2 mesh to #60 mesh (Tyler) to remove particles of butter larger than #4 mesh (4.8 mm). The particles of chopped butter that had passed through the 4 mesh sieve were pooled and placed at −30° F. until used for production of the final product.

EXAMPLE 3

Preparation of Butter in Margarine Composition

Ten lbs. of frozen (−10° F.) chopped butter particles (0.04–4.8 mm size) were placed in the hopper of a Fruit feeder. The Fruit feeder was set (by adjusting variable speed drive) to inject 5% by weight of the chopped butter particles into the margarine matrix.

The margarine matrix was prepared by conventional methods by making an emulsion of fat and aqueous phase in a margarine churn, then cooling the emulsion via conventional Votators to produce the plastic margarine matrix.

The plastic margarine matrix was led to the Fruit feeder which injected the desired amount of chopped butter into the margarine. The final product was collected in ½ lb. margarine tubs and placed in 45° F. storage.

EXAMPLE 4

Preparation of Butter in Maragarine

The Armour Flavor-up Color 9 butter described in Example 1 is used in the present example.

The margarines contain the following ingredients:

| Print Margarine Formulation | |
|---|---|
| | % |
| Oil Base stock | 79.6410 |
| Monoglyceride[a] | 0.25 |
| Lecithin | 0.22 |
| Water | 16.272 |
| Salt | 2.0 |
| Sodium benzoate | 0.1 |
| 85% lactic acid | 0.017 |
| Vitamins and color in an oil carrier[b] | 0.003 |
| Flavor[c] | 0.025 |

[a]Emulsifier made from soybean oil hardened to an iodine value of 75 to 79 and having a 20° C. dilatation value of 375 and a 20° C. NMR value of 13.8.
[b]Sufficient so that 3600 lbs. of margarine contains 41.40 million IU Vitamin A, 19.80 million IU beta carotene, and 7.92 million IU Vitamin $D_2$.
[c]IFF butter flavor number 73528621.

| Soft Margarine Formulation | |
|---|---|
| | % |
| Margarine base | 79.5310 |
| Monoglyceride[a] | 0.36 |
| Lecithin | 0.22 |

-continued

| Soft Margarine Formulation | |
|---|---|
| | % |
| Water | 16.443 |
| Whey Solids | 1.514 |
| Salt | 1.75 | with agitation to form a water-in-oil emulsion. The emulsion is then fed to a Votator which supercools the margarine.

The butter particles are dispersed in the margarine matrix in accordance with Example 3 in the proportions indicated in Table 2.

TABLE 2
BUTTER IN MARGARINE MATRIX

| | % Butter Particles | Particle Size (mm) | Wiley M.P. of particles °F. | % Fat in Butter | % Margarine Matrix | % Fat in margarine | Color % | Flavor % | Lactic Acid % | Salt % | Whey Solids | Emulsifier % | Preservatives % sodium benzoate/ potassium sorbate (1:1) |
|---|---|---|---|---|---|---|---|---|---|---|---|---|---|
| A | 2.5 | 0.35–2.38 | 87.8 | 80.0 | 97.5 | 80.0 | 0.003 | 0.0059 | 0.04 | 2.0 | 1.5 | 0.5 | 0.05 |
| B | 5.0 | 0.35–2.38 | 87.8 | 80.0 | 95.0 | 80.0 | 0.003 | 0.0059 | 0.04 | 2.0 | 1.5 | 0.5 | 0.05 |
| C | 10.0 | 0.35–2.38 | 87.8 | 80.0 | 90.0 | 80.0 | 0.003 | 0.0059 | 0.04 | 2.0 | 1.5 | 0.5 | 0.05 |
| D | 20.0 | 0.35–2.38 | 87.8 | 80.0 | 80.0 | 80.0 | 0.003 | 0.0059 | 0.04 | 2.0 | 1.5 | 0.5 | 0.05 |
| E | 30.0 | 0.35–2.38 | 87.8 | 80.0 | 70.0 | 80.0 | 0.003 | 0.0059 | 0.04 | 2.0 | 1.5 | 0.5 | 0.05 |
| F | 10.0 | 0.04–4.80 | 88.0 | 80.0 | 90.0 | 70.0 | 0.003 | 0.0059 | 0.04 | 2.0 | 1.5 | 0.5 | 0.05 |
| G | 10.0 | 0.08–4.00 | 88.0 | 80.0 | 90.0 | 70.0 | 0.003 | 0.0059 | 0.04 | 2.0 | 1.5 | 0.5 | 0.05 |
| H | 10.0 | 0.149–2.83 | 88.0 | 80.0 | 90.0 | 70.0 | 0.003 | 0.0059 | 0.04 | 2.0 | 1.5 | 0.5 | 0.05 |
| I | 10.0 | 0.25–1.68 | 88.0 | 80.0 | 90.0 | 70.0 | 0.003 | 0.0059 | 0.04 | 2.0 | 1.5 | 0.5 | 0.05 |
| J | 10.0 | 0.35–1.00 | 88.0 | 80.0 | 90.0 | 70.0 | 0.003 | 0.0059 | 0.04 | 2.0 | 1.5 | 0.5 | 0.05 |
| K | 20.0 | 0.177–3.36 | 99.0 | 82.0 | 80.0 | 60.0 | 0.003 | 0.0059 | 0.04 | 2.0 | 1.5 | 0.5 | 0.05 |
| L | 20.0 | 0.177–3.36 | 99.0 | 84.0 | 80.0 | 60.0 | 0.003 | 0.0059 | 0.04 | 2.0 | 1.5 | 0.5 | 0.05 |
| M | 20.0 | 0.177–3.36 | 99.0 | 88.0 | 80.0 | 60.0 | 0.003 | 0.0059 | 0.04 | 2.0 | 1.5 | 0.5 | 0.05 |
| N | 20.0 | 0.177–3.36 | 99.0 | 90.0 | 80.0 | 60.0 | 0.003 | 0.0059 | 0.04 | 2.0 | 1.5 | 0.5 | 0.05 |
| O | 20.0 | 0.177–3.36 | 99.0 | 100.0 | 80.0 | 60.0 | 0.003 | 0.0059 | 0.04 | 2.0 | 1.5 | 0.5 | 0.05 |
| P | 0.1 | 0.35–2.38 | 90.0 | 10.0 | 99.9 | 100.0 | 0.003 | 0.0059 | 0.04 | 2.0 | 1.5 | 0.5 | 0.05 |
| Q | 40.0 | 0.35–2.38 | 90.0 | 40.0 | 60.0 | 20.0 | 0.003 | 0.0059 | 0.04 | 2.0 | 1.5 | 0.5 | 0.05 |
| R | 80.0 | 0.35–2.38 | 90.0 | 60.0 | 20.0 | 10.0 | 0.003 | 0.0059 | 0.04 | 2.0 | 1.5 | 0.5 | 0.05 |

| | |
|---|---|
| Potassium sorbate | 0.05 |
| 85% lactic acid | 0.043 |
| Vitamins and color in an oil carrier[b] | 0.030 |
| Flavor[c] | 0.059 |

[a]Cottonseed oil having an iodine value of 74 to 79 and a 20° C. dilatation value of 375 and a 20° NMR value of 13.8.
[b]Sufficient so that 3600 lbs. of margarine contains 41.40 million IU Vitamin A, 19.80 million IU beta carotene, and 7.92 million IU Vitamin $D_2$.
[c]IFF butter flavor number 73528621.

The margarine base stock is prepared from 374 lbs. of a softstock, and 261 lbs. of a hardstock. The softstock, the hardstock, and the mixture of softstock and hardstock have solids as measured by NMR of:

| Temperature | Softstock | Hardstock | Margarine Base Stock |
|---|---|---|---|
| 0° C. | 46 | 90.8 | 48.8 |
| 20° C. | 17.9 | 68.8 | 20.2 |
| 36° C. | 0.40 | 6.2 | 0.4 |
| 42° C. | 0 | 0 | |

The hardstock is prepared from 50 lbs. of cottonseed oil hardened to a refractive index of 47.1 and 750 lbs. of soy bean oil hardened to iodine value of 75.7.

Preparation of the Margarine

The water-soluble ingredients are dissolved in the water phase. The vitamin concentrates, flavoring materials, emulsifiers, color are added to the oil phase. The emulsifying tanks are equipped with efficient agitators. They are first charged with the oil phase at a temperature somewhat above that desired in the emulsion (115°–120° F.) and the cold aqueous phase is then added with agitation to form a water-in-oil emulsion. The emulsion is then fed to a Votator which supercools the margarine.

The butter particles are dispersed in the margarine matrix in accordance with Example 3 in the proportions indicated in Table 2.

EXAMPLE 5

Cream Cheese in Synthetic Cream Cheese

The synthetic cream cheese contains the following ingredients:

| VEGETABLE DAIRY CREAM CHEESE (Acidified) | |
|---|---|
| Ingredients | Percent |
| Sodium Caseinate | 2.00 |
| 24 D.E. Corn Syrup Solids | 7.00 |
| Salt | 0.15 |
| Stabilizer[a] | 2.40 |
| Water | 62.45 |
| DURKEE'S KAOMEL[b] | 25.00 |
| DURKEE'S DUR-EM 117[c] | 0.15 |
| Flavored lactic acid | 0.85 |
| Total | 100.00 |

[a]Stabilac 3500 Base produced by Blanke-Baer Food Products Corp. (mixture of starches, gums and emulsifiers).
[b]Partially hydrogenated soybean and cottonseed oil.
[c]Mono/diglycerides with citric acid - Durkee Industrial Food Group - SCM Corp.

Procedure: Dry mix sodium caseinate, corn syrup solids and salt with stabilizer and add to water. Mix to disperse solids. Add KAOMEL and DUR-EM 117 and heat mixture to 175° F. Homogenize mix at 2500 pounds through a single-stage homogenizer. Cool mix to 60° F. and add acid slowly with light agitation. Cool to 40° F. and package.

The cream cheese particles are dispersed in the synthetic cream cheese in the proportions indicated in Table 3.

TABLE 3
CREAM CHEESE PARTICLES DISPERSED IN AN ARTIFICIAL CREAM CHEESE MATRIX

| | % Cream Cheese Particles | Particle Size mm | Wiley M.P. of particles °F. | % Fat in Cream Cheese | % Cream Cheese Matrix | % Fat in Cream Cheese Matrix | Stabilizer Guar Gum | Non-fat Milk Solids | Emulsifier | Flavor | Salt |
|---|---|---|---|---|---|---|---|---|---|---|---|
| A | 2.5  | 0.35–2.38  | 87.8 | 80.0 | 97.5 | 80.0  | 0.45 | 10.0 | 0.5 | 0.1 | 0.5 |
| B | 5.0  | 0.35–2.38  | 87.8 | 80.0 | 95.0 | 80.0  | 0.45 | 10.0 | 0.5 | 0.1 | 0.5 |
| C | 10.0 | 0.35–2.38  | 87.8 | 80.0 | 90.0 | 80.0  | 0.45 | 10.0 | 0.5 | 0.1 | 0.5 |
| D | 20.0 | 0.35–2.38  | 87.8 | 80.0 | 80.0 | 80.0  | 0.45 | 10.0 | 0.5 | 0.1 | 0.5 |
| E | 30.0 | 0.35–2.38  | 87.8 | 80.0 | 70.0 | 80.0  | 0.45 | 10.0 | 0.5 | 0.1 | 0.5 |
| F | 10.0 | 0.04–4.80  | 88.0 | 80.0 | 90.0 | 70.0  | 0.45 | 10.0 | 0.5 | 0.1 | 0.5 |
| G | 10.0 | 0.08–4.00  | 88.0 | 80.0 | 90.0 | 70.0  | 0.45 | 10.0 | 0.5 | 0.1 | 0.5 |
| H | 10.0 | 0.149–2.83 | 88.0 | 80.0 | 90.0 | 70.0  | 0.45 | 10.0 | 0.5 | 0.1 | 0.5 |
| I | 10.0 | 0.25–1.68  | 88.0 | 80.0 | 90.0 | 70.0  | 0.45 | 10.0 | 0.5 | 0.1 | 0.5 |
| J | 10.0 | 0.35–1.00  | 88.0 | 80.0 | 9.0  | 70.0  | 0.45 | 10.0 | 0.5 | 0.1 | 0.5 |
| K | 20.0 | 0.177–3.36 | 99.0 | 82.0 | 80.0 | 60.0  | 0.45 | 10.0 | 0.5 | 0.1 | 0.5 |
| L | 20.0 | 0.177–3.36 | 99.0 | 84.0 | 80.0 | 60.0  | 0.45 | 10.0 | 0.5 | 0.1 | 0.5 |
| M | 20.0 | 0.177–3.36 | 99.0 | 88.0 | 80.0 | 60.0  | 0.45 | 10.0 | 0.5 | 0.1 | 0.5 |
| N | 20.0 | 0.177–3.36 | 99.0 | 90.0 | 80.0 | 60.0  | 0.45 | 10.0 | 0.5 | 0.1 | 0.5 |
| O | 20.0 | 0.177–3.36 | 99.0 | 100.0| 80.0 | 60.0  | 0.45 | 10.0 | 0.5 | 0.1 | 0.5 |
| P | 0.1  | 0.35–2.38  | 90.0 | 10.0 | 99.9 | 100.0 | 0.45 | 10.0 | 0.5 | 0.1 | 0.5 |
| Q | 40.0 | 0.35–2.38  | 90.0 | 40.0 | 60.0 | 20.0  | 0.45 | 10.0 | 0.5 | 0.1 | 0.5 |
| R | 80.0 | 0.35–2.38  | 90.0 | 60.0 | 20.0 | 10.0  | 0.45 | 10.0 | 0.5 | 0.1 | 0.5 |

EXAMPLE 6

Example of Thickening Sour Cream to Obtain Particles Which Will Hold Their Shape One pound (45.4 gm) of Breakstone's cultured sour cream was placed in a Waring Blender jar and agitated at high speed. One percent by weight (4.54 gm) of xanthan gum (Keltral-Kelco Co.) was then added directly to the sour cream with vigorous agitation. After two minutes, a thickened sour cream matrix had formed which was plastic at 45° F. The thickened sour cream was then frozen at −10° F. and chopped and sieved in the same manner used for the butter.

EXAMPLE 7

Preparation of Butter in Margarine Prints with Comminuted Butter Particles

The butter particles and the margarine matrix of Example 4 are used in the present example.

Upon discharge of the margarine in the form of a supercooled liquid from a Votator it is fed to a resting tube system where said margarine crystallizes. The crystallized margarine stock is extruded through a perforated plate at the end of the resting tube system to form spaghetti strands. The spaghetti strands are fed to a mixing box comprising a worm assembly through a feed hopper. The butter particles of Example 4 are sprinkled onto said spaghetti strands at said feed hopper to cause said butter particles to be dispersed within said spaghetti strands in the proportions indicated in Table 2.

The sprinkled strands are picked up by a worm assembly, intimately mixed or brought together to cause the butter particles to be uniformly dispersed throughout the margarine matrix and the product margarine containing uniformly dispersed butter particles extruded through the mold head of a Morpac unit in the form of ¼ lb. prints.

These prints have the desired butter-like taste, texture and mouthfeel as contemplated by the invention.

EXAMPLE 8

Preparation of Butter in Margarine Prints with Butter Particles Comminuted After Addition to the Margarine Matrix The procedure described in Example 7 is followed in every detail except that cryogenically treated butter particles in the size range of 10.0 to 20.0 mm are not comminuted prior to addition to the extruded margarine in the form of spaghetti strands.

The butter particles are comminuted after admixture with the margarine in the form of spaghetti strands and passage through a worm assembly and extrusion past a perforated plate prior to final passage through the mold head of a Morpac unit to form ¼ lb. prints. The perforated plate has a multitude of holes ranging in diameter from 0.04 mm to 10.0 mm.

These prints have the desired butter-like taste, texture and mouthfeel as contemplated by the invention.

EXAMPLE 9

Sour Cream in Synthetic Sour Cream

The following formula shown illustrates a sour dressing that is to be cultured.

| EXAMPLE Synthetic Sour Cream Sour Dressing (Cultured) | |
|---|---|
| Ingredients | Percent |
| Nonfat Milk Solids | 9.00 |
| DURKEE'S SOUR CREAM ENHANCER #487[a] | 0.10 |
| Guar gum | 0.4 |
| Water | 72.0± |
| DURKEE'S KAOMEL[b] | 18.00 |
| DURKEE'S DUR-EM 117[c] | 0.50 |
| Total | 100.00 |

[a]Flavor of Durkee Division of SCM Corporation.
[b]Partially hydrogenated soybean and cottonseed oil.
[c]Mono/diglycerides with citric acid - Durkee Industrial Foods Group - SCM Corp.

Procedure: Dissolve nonfat milk solids, SOUR CREAM ENHANCER and stabilizer in cool water. Mix well to dissolve solids. Heat to 110° F. and add DUR-EM 117 and KAOMEL. Pasteurize at 165° F. for 20 to 30 minutes. Homogenize mix at 2,000 psig pressure and 500 psig pressure through a two-stage homogenizer. Cool mix at 65° F. and add 2% to 5% culture. Incubate at 72° F. until desired acidity is obtained. Cool at 40° F. and package.

The sour cream particles are dispersed in the synthetic sour cream in the proportions indicated in Table 4 according to the same procedure as Example 3.

TABLE 4

SOUR CREAM PARTICLES DISPERSED IN AN ARTIFICAL SOUR CREAM MATRIX

| | % Cheese Particles | Particle Size mm | Wiley M.P. of particles °F. | % Fat in Sour Cream | % Sour Cream Matrix | % Fat in Sour Cream Matrix | Stabilizer Guar Gum | Non-fat Milk Solids | Emulsifier | Flavor |
|---|---|---|---|---|---|---|---|---|---|---|
| A | 2.5 | 0.35–2.38 | 87.8 | 80.0 | 97.5 | 80.0 | 0.4 | 9.0 | 0.5 | 0.1 |
| B | 5.0 | 0.35–2.38 | 87.8 | 80.0 | 95.0 | 80.0 | 0.4 | 9.0 | 0.5 | 0.1 |
| C | 10.0 | 0.35–2.38 | 87.8 | 80.0 | 90.0 | 80.0 | 0.4 | 9.0 | 0.5 | 0.1 |
| D | 20.0 | 0.35–2.38 | 87.8 | 80.0 | 80.0 | 80.0 | 0.4 | 9.0 | 0.5 | 0.1 |
| E | 30.0 | 0.35–2.38 | 87.8 | 80.0 | 70.0 | 80.0 | 0.4 | 9.0 | 0.5 | 0.1 |
| F | 10.0 | 0.04–4.80 | 88.0 | 80.0 | 90.0 | 70.0 | 0.4 | 9.0 | 0.5 | 0.1 |
| G | 10.0 | 0.08–4.00 | 88.0 | 80.0 | 90.0 | 70.0 | 0.4 | 9.0 | 0.5 | 0.1 |
| H | 10.0 | 0.149–2.83 | 88.0 | 80.0 | 90.0 | 70.0 | 0.4 | 9.0 | 0.5 | 0.1 |
| I | 10.0 | 0.25–1.68 | 88.0 | 80.0 | 90.0 | 70.0 | 0.4 | 9.0 | 0.5 | 0.1 |
| J | 10.0 | 0.35–1.00 | 88.0 | 80.0 | 90.0 | 70.0 | 0.4 | 9.0 | 0.5 | 0.1 |
| K | 20.0 | 0.177–3.36 | 99.0 | 82.0 | 80.0 | 60.0 | 0.4 | 9.0 | 0.5 | 0.1 |
| L | 20.0 | 0.177–3.36 | 99.0 | 84.0 | 80.0 | 60.0 | 0.4 | 9.0 | 0.5 | 0.1 |
| M | 20.0 | 0.177–3.36 | 99.0 | 88.0 | 80.0 | 60.0 | 0.4 | 9.0 | 0.5 | 0.1 |
| N | 20.0 | 0.177–3.36 | 99.0 | 90.0 | 80.0 | 60.0 | 0.4 | 9.0 | 0.5 | 0.1 |
| O | 20.0 | 0.177–3.36 | 99.0 | 100.0 | 80.0 | 60.0 | 0.4 | 9.0 | 0.5 | 0.1 |
| P | 0.1 | 0.35–2.38 | 90.0 | 10.0 | 99.9 | 100.0 | 0.4 | 9.0 | 0.5 | 0.1 |
| Q | 40.0 | 0.35–2.38 | 90.0 | 40.0 | 60.0 | 20.0 | 0.4 | 9.0 | 0.5 | 0.1 |
| R | 80.0 | 0.35–2.38 | 90.0 | 60.0 | 20.0 | 10.0 | 0.4 | 9.0 | 0.5 | 0.1 |

EXAMPLE 10

Cheese in Cheese Spread

The cheeses of this example are natural colby cheese, edam cheese, swiss cheese, cheddar cheese, and gouda cheese.

The cheese particles are dispersed in the cheese spread matrix in the proportions indicated in Table 5.

Having now fully described the invention, it will be apparent to one of ordinary skill in the art that many changes and modifications can be made thereto without departing from the spirit or scope of the invention as set forth herein.

What is claimed is:

1. An edible, non-pourable plastic or semi-plastic composition comprising 0.1 to 80% by weight of discrete, fat-bearing particles selected from the group consisting of plastic, semi-plastic and liquid particles dispersed in a fat-bearing plastic or semi-plastic matrix, said matrix and said particles each comprising 10 to 100% by weight of fat, said particles having a size of about 0.04 mm to 10.0 mm and a Wiley mp less than 100° F.

2. An edible non-pourable composition according to claim 1 wherein the particles are plastic or semi-plastic.

3. An edible non-pourable composition according to claim 2 wherein the plastic or semi-plastic particles are in their natural crystalline state.

4. An edible composition comprising 0.1 to 80% by weight of discrete plastic or semi-plastic particles of butter dispersed in margarine said particles having a size of 0.04 to 10.0 mm.

TABLE 5

CHEESE PARTICLES DISPERSED IN A CHEESE SPREAD MATRIX

| | % Cheese Particles | Particle Size mm | Wiley M.P. of Particles °F. | % Fat in Cheese | % Cheese Matrix | % Fat in Cheese Matrix | Cheese Whey Solids | Non-fat Milk Solids | Disodium phosphate | Salt | Xanthan gum | Sorbic Acid | Coloring | Flavoring |
|---|---|---|---|---|---|---|---|---|---|---|---|---|---|---|
| A | 2.5[a] | 0.35–2.38 | 87.8 | 80.0 | 97.5 | 80.0 | 10.0 | 6.5 | 2.0 | 1.5 | 0.3 | 0.2 | 0.1 | 0.1 |
| B | 5.0[b] | 0.35–2.38 | 87.8 | 80.0 | 95.0 | 80.0 | 10.0 | 6.5 | 2.0 | 1.5 | 0.3 | 0.2 | 0.1 | 0.1 |
| C | 10.0[c] | 0.35–2.38 | 87.8 | 80.0 | 90.0 | 80.0 | 10.0 | 6.5 | 2.0 | 1.5 | 0.3 | 0.2 | 0.1 | 0.1 |
| D | 20.0[d] | 0.35–2.38 | 87.8 | 80.0 | 80.0 | 80.0 | 10.0 | 6.5 | 2.0 | 1.5 | 0.3 | 0.2 | 0.1 | 0.1 |
| E | 30.0[e] | 0.35–2.38 | 87.8 | 80.0 | 70.0 | 80.0 | 10.0 | 6.5 | 2.0 | 1.5 | 0.3 | 0.2 | 0.1 | 0.1 |
| F | 10.0[a] | 0.04–4.80 | 88.0 | 80.0 | 90.0 | 70.0 | 10.0 | 6.5 | 2.0 | 1.5 | 0.3 | 0.2 | 0.1 | 0.1 |
| G | 10.0[b] | 0.08–4.00 | 88.0 | 80.0 | 90.0 | 70.0 | 10.0 | 6.5 | 2.0 | 1.5 | 0.3 | 0.2 | 0.1 | 0.1 |
| H | 10.0[c] | 0.149–2.83 | 88.0 | 80.0 | 90.0 | 70.0 | 10.0 | 6.5 | 2.0 | 1.5 | 0.3 | 0.2 | 0.1 | 0.1 |
| I | 10.0[d] | 0.25–1.68 | 88.0 | 80.0 | 90.0 | 70.0 | 10.0 | 6.5 | 2.0 | 1.5 | 0.3 | 0.2 | 0.1 | 0.1 |
| J | 10.0[e] | 0.35–1.00 | 88.0 | 80.0 | 90.0 | 70.0 | 10.0 | 6.5 | 2.0 | 1.5 | 0.3 | 0.2 | 0.1 | 0.1 |
| K | 20.0[a] | 0.177–3.36 | 99.0 | 82.0 | 80.0 | 60.0 | 10.0 | 6.5 | 2.0 | 1.5 | 0.3 | 0.2 | 0.1 | 0.1 |
| L | 20.0[b] | 0.177–3.36 | 99.0 | 84.0 | 80.0 | 60.0 | 10.0 | 6.5 | 2.0 | 1.5 | 0.3 | 0.2 | 0.1 | 0.1 |
| M | 20.0[c] | 0.177–3.36 | 99.0 | 88.0 | 80.0 | 60.0 | 10.0 | 6.5 | 2.0 | 1.5 | 0.3 | 0.2 | 0.1 | 0.1 |
| N | 20.0[d] | 0.177–3.36 | 99.0 | 90.0 | 80.0 | 60.0 | 10.0 | 6.5 | 2.0 | 1.5 | 0.3 | 0.2 | 0.1 | 0.1 |
| O | 20.0[e] | 0.177–3.36 | 99.0 | 100.0 | 80.0 | 60.0 | 10.0 | 6.5 | 2.0 | 1.5 | 0.3 | 0.2 | 0.1 | 0.1 |
| P | 0.1[a] | 0.35–2.38 | 90.0 | 10.0 | 99.9 | 100.0 | 10.0 | 6.5 | 2.0 | 1.5 | 0.3 | 0.2 | 0.1 | 0.1 |
| Q | 40.0[b] | 0.35–2.38 | 90.0 | 40.0 | 60.0 | 20.0 | 10.0 | 6.5 | 2.0 | 1.5 | 0.3 | 0.2 | 0.1 | 0.1 |
| R | 80.0[c] | 0.35–2.38 | 90.0 | 60.0 | 20.0 | 10.0 | 10.0 | 6.5 | 2.0 | 1.5 | 0.3 | 0.2 | 0.1 | 0.1 |

[a]Colby Cheese
[b]Edam Cheese
[c]Swiss Cheese
[d]Cheddar Cheese
[e]Gouda Cheese 5. An edible composition comprising 0.1 to 80% by weight of discrete particles selected from the group consisting of plastic, semi-plastic and liquid particles of sour cream having a size of 0.04 to 10.0 mm dispersed in a plastic or semi-plastic synthetic sour cream matrix.

6. An edible composition comprising 0.1 to 80% by weight of discrete particles selected from the group consisting of plastic, semi-plastic and liquid particles of cream cheese having a size of 0.04 to 10.0 mm dispersed in a plastic or semi-plastic synthetic cream cheese matrix.

7. An edible composition comprising 0.1 to 80% by weight of discrete plastic or semi-plastic particles of cheese having a size of 0.04 to 10.0 mm dispersed in a plastic or semi-plastic cheese spread.

8. The edible composition according to claim 1 wherein the composition comprises 2 to 60% by weight of the particles.

9. The edible composition according to claim 1 wherein the composition comprises 5 to 40% by weight of the particles.

10. The edible composition according to claim 4 wherein the composition comprises 2 to 60% by weight of the particles.

11. The edible composition according to claim 4 wherein the composition comprises 5 to 40% by weight of the particles.

12. The edible composition according to claim 5 wherein the composition comprises 2 to 60% by weight of the particles.

13. The edible composition according to claim 5 wherein the composition comprises 5 to 40% by weight of the particles.

14. The edible composition according to claim 6 wherein the composition comprises 2 to 60% by weight of the particles.

15. The edible composition according to claim 6 wherein the composition comprises 5 to 40% by weight of the particles.

16. The edible composition according to claim 7 wherein the composition comprises 2 to 60% by weight of the particles.

17. The edible composition according to claim 7 wherein the composition comprises 5 to 40% by weight of the particles.

18. The edible composition according to claim 1 wherein the particles contain 30 to 97.5% by weight of fat.

19. The edible composition according to claim 1 wherein the particles contain 65 to 85% by weight of fat.

20. The edible composition according to claim 1 wherein the particles further comprise up to 90% by weight of water.

21. The edible composition according to claims 1, 4, 5, 6 or 7 wherein the particles have sizes of 0.07 to 2.4 mm.

22. The edible composition according to claims 1, 4, 5, 6 or 7 wherein the particles have sizes of 0.18 to 1.0 mm.

23. The edible composition according to claims 1, 4, 5, 6 or 7 wherein the particles consist essentially of natural materials.

24. An edible, liquid composition comprising 0.1 to 80% by weight of discrete particles of butter having a Wiley melting point less than 100° F. and a particle size of 0.04 to 10.0 mm in a liquid margarine.

* * * * *